US010484139B2

(12) United States Patent
Aldereguia et al.

(10) Patent No.: US 10,484,139 B2
(45) Date of Patent: Nov. 19, 2019

(54) ADDRESS VERIFICATION ON A BUS

(71) Applicant: LENOVO ENTERPRISE SOLUTIONS (SINGAPORE) PTE. LTD., Singapore (SG)

(72) Inventors: Alfredo Aldereguia, Cary, NC (US); Jeffrey R. Hamilton, Pittsboro, NC (US); Clifton E. Kerr, Durham, NC (US); Grace A. Richter, Cary, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 85 days.

(21) Appl. No.: 14/491,096

(22) Filed: Sep. 19, 2014

(65) Prior Publication Data

US 2016/0085614 A1  Mar. 24, 2016

(51) Int. Cl.
*H04L 1/16* (2006.01)
*H04L 1/18* (2006.01)
*H04L 1/02* (2006.01)
*H04L 1/00* (2006.01)

(52) U.S. Cl.
CPC .......... *H04L 1/1607* (2013.01); *H04L 1/1829* (2013.01); *H04L 2001/0094* (2013.01)

(58) Field of Classification Search
CPC .. G06F 11/10; G06F 11/1076; G06F 11/1016; G06F 11/1068; H04L 1/1607; H04L 1/1829; H04L 2001/0094
See application file for complete search history.

(56) References Cited

U.S. PATENT DOCUMENTS

| 3,560,935 | A | * | 2/1971 | Beers | G06F 9/4812 |
| | | | | | 710/262 |
| 5,003,536 | A | * | 3/1991 | Tanaka | H04L 12/407 |
| | | | | | 370/218 |
| 5,155,735 | A | * | 10/1992 | Nash | G06F 11/10 |
| | | | | | 710/260 |

(Continued)

OTHER PUBLICATIONS

IBM, "I2C with Bitwise Parity, Slave Acknowledgement on Read, and Slave Request Function", Technical Disclosure, IP.com Prior Art Database (online publication), Nov. 2008, pp. 1-16, IP.com No. IPCOM000176245D.

(Continued)

*Primary Examiner* — April Y Blair
*Assistant Examiner* — Dipakkumar B Gandhi

(57) ABSTRACT

Address verification on a bus, the bus connecting a plurality of receiving bus nodes and one or more sending bus nodes, the bus providing communication among the bus nodes, including: receiving, by a receiving bus node over the bus, a parity signal and an address signal, the address signal identifying an address of a target receiving bus node; determining, by the receiving bus node, whether the address of the target receiving bus node matches an address of the receiving bus node; responsive to determining that the address of the target receiving bus node matches the address of the receiving bus node, determining, by the receiving bus node, whether the parity signal is an expected parity signal; and responsive to determining that the parity signal is not the expected parity signal, suppressing, by the receiving bus node, an acknowledgment of receipt of the address signal.

20 Claims, 5 Drawing Sheets

(56) References Cited

U.S. PATENT DOCUMENTS

| | | | |
|---|---|---|---|
| 5,272,725 A | 12/1993 | Jones et al. | |
| 5,544,319 A * | 8/1996 | Acton | G06F 12/0292 709/246 |
| 5,838,747 A * | 11/1998 | Matsumoto | H04L 5/16 375/219 |
| 6,321,366 B1 | 11/2001 | Tseng et al. | |
| 6,385,754 B1 * | 5/2002 | Mizumoto | G06F 11/10 714/800 |
| 6,728,908 B1 | 4/2004 | Fukuhara et al. | |
| 6,874,052 B1 | 3/2005 | Delmonico | |
| 6,986,097 B1 * | 1/2006 | Ireland | H03M 13/615 714/752 |
| 7,185,114 B1 * | 2/2007 | Hariharasubrahmanian | H04L 1/1671 709/250 |
| 7,417,576 B2 | 8/2008 | Prestros | |
| 7,502,991 B2 | 3/2009 | Aldereguia et al. | |
| 7,627,800 B2 | 12/2009 | Aldereguia et al. | |
| 7,721,155 B2 | 5/2010 | Holdaway et al. | |
| 7,783,964 B2 | 8/2010 | Aldereguia et al. | |
| 7,805,629 B2 | 9/2010 | Insley et al. | |
| 8,239,597 B2 | 8/2012 | Wishneusky | |
| 2007/0165672 A1 * | 7/2007 | Keels | H04L 1/0061 370/474 |
| 2007/0271490 A1 * | 11/2007 | Aldereguia | G06F 11/1008 714/746 |
| 2008/0298356 A1 * | 12/2008 | Deng | H04B 7/12 370/389 |
| 2010/0046518 A1 * | 2/2010 | Takagi | H04L 12/413 370/392 |
| 2010/0202347 A1 * | 8/2010 | Sridhara | H04L 1/1607 370/328 |
| 2013/0343197 A1 | 12/2013 | DeCesaris et al. | |
| 2013/0346658 A1 | 12/2013 | DeCesaris et al. | |
| 2013/0346763 A1 | 12/2013 | DeCesaris et al. | |
| 2013/0346835 A1 | 12/2013 | DeCesaris et al. | |

OTHER PUBLICATIONS

IBM, "Recoverable Bi-directional i2c Protocol with Parity for Communication Between Multi-node Systems", Technical Disclosure, IP.com Prior Art Database (online publication), Jun. 2005, pp. 1-3, IP.com No. IPCOM000125917D.

Aalbers, "CDHS Design For A University Nano-Satellite", Conference Paper, AIAA 57th International Astronautical Congress (IAC 2006), Oct. 2006, pp. 1-12, American Institute of Aeronautics and Astronautics Inc., Reston, Virginia, ISBN: 9781605600390.

* cited by examiner

US 10,484,139 B2

ADDRESS VERIFICATION ON A BUS

BACKGROUND OF THE INVENTION

Field of the Invention

The field of the invention is data processing, or, more specifically, methods, apparatus, and products for address verification on a bus.

Description of Related Art

Modern computing systems include computing components such as computer processors, computer memory, and a wide range of computer peripherals that extend the functionality of the computing system. Such computing components may frequently be connected via one or more computer busses, such as an Inter-Integrated Circuit ('I2C') bus. Data communications over a computer bus, however, may be unstable as acknowledgements of receipt of a data transmission are utilized to provide some indication that data was received, but no error detection or error correction is provided by many bus communications standards.

SUMMARY OF THE INVENTION

Methods and apparatus for address verification on a bus, the bus connecting a plurality of receiving bus nodes and one or more sending bus nodes, the bus providing communication among the bus nodes, including: receiving, by a receiving bus node over the bus, a parity signal and an address signal, the address signal identifying an address of a target receiving bus node; determining, by the receiving bus node, whether the address of the target receiving bus node matches an address of the receiving bus node; determining, by the receiving bus node, whether the parity signal is an expected parity signal; and responsive to determining that the parity signal is not the expected parity signal, suppressing, by the receiving bus node, an acknowledgment of receipt of the address signal.

Methods of method of address verification on a bus, the bus connecting a plurality of receiving bus nodes and one or more sending bus nodes, the bus providing communication among the bus nodes, including: transmitting, by a sending bus node over the bus, a parity signal and an address signal, the address signal identifying an address of a target receiving bus node; determining, by the sending bus node, whether at least one of the parity signal or the address signal were interfered with during transmission; and responsive to determining that at least one of the parity signal and the address signal were interfered with during transmission, retransmitting, by the sending bus node over the bus, the parity signal and the address signal.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1:
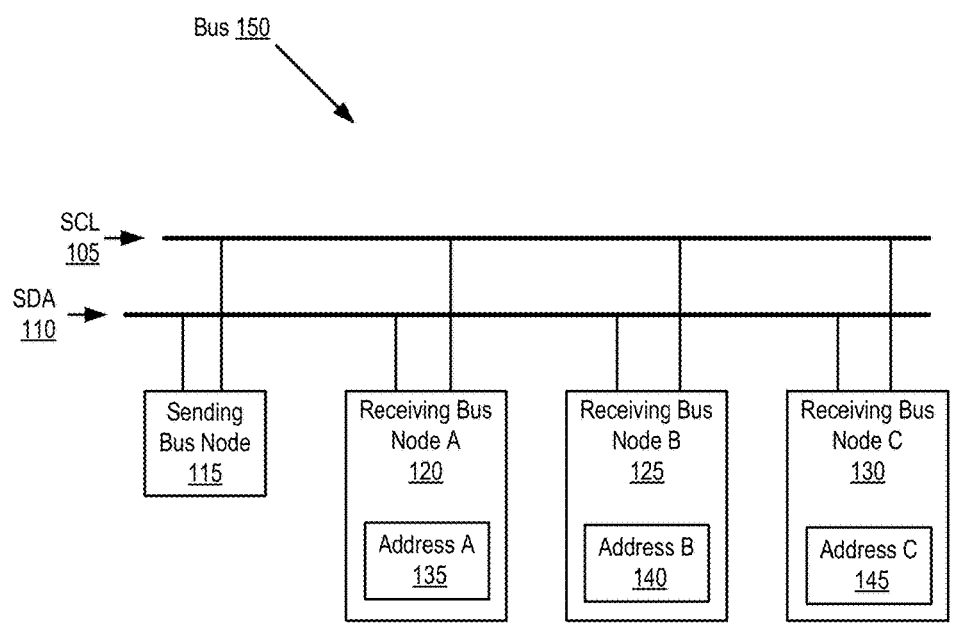
FIG. 1 sets forth a block diagram of a bus according to embodiments of the present invention.

Example methods, apparatuses, and products for address verification on a bus in accordance with the present invention are described with reference to the accompanying drawings, beginning with FIG. 1. FIG. 1 sets forth a block diagram of a bus according to embodiments of the present invention. The bus (150) of FIG. 1 is a communication system that allows for computer signals to be transferred among components in a computer system. One type of bus, which is depicted in FIG. 1, is an inter-integrated circuit ('I2C') bus. The I2C bus (150) of FIG. 1 can include two bidirectional open-drain lines connecting one or more sending bus nodes, also known as master nodes, and a plurality of receiving bus nodes, also known as slave nodes. The two bidirectional open-drain lines include the serial data line ('SDA') (110) and the serial clock line ('SCL') (105).

The bus (150) depicted in FIG. 1 connects a plurality of receiving bus nodes (120, 125, 130) and one or more sending bus nodes (115). The sending bus node (115) depicted in FIG. 1 may be embodied as computer hardware, such as a special purpose microcontroller, that generates a clock signal that is transmitted over the SCL and also initiates and carries out data communications with receiving bus nodes (120, 125, 130) by placing signals that correspond to binary data on the SDA. In an embodiment where the bus (150) is an I2C bus, data is transferred in sequences of eight bits that are placed on the SDA line starting with the most significant bit. Each bit is read off of the SDA line when the SCL line is pulsed high. For every eight bits that are transferred, the receiving bus node (120, 125, 130) that is receiving the data typically sends back an acknowledge bit, such that nine SCL clock pulses are needed to transfer each byte of data. If the receiving bus node (120, 125, 130) that is receiving the data sends back a low ACK bit to the sending bus node (115), the receiving bus node (120, 125, 130) is thereby indicating that it has received the data and is ready to accept another byte. If the receiving bus node (120, 125, 130) that is receiving the data sends back a high ACK bit to the sending bus node (115), however, the receiving bus node (120, 125, 130) is indicating that it cannot accept any further data and that the sending bus node (115) should terminate the transfer by sending a stop sequence. Readers of skill in the art will recognize that the although terms 'sending' and 'receiving' are associated with each bus node, at various points in an exchange of data over the bus (150), each type of bus node may send data and each type of bus node may receive data. Such an exchange of data, however, may only be initiated by the sending bus node (115) serving in its role as the master node.

The receiving bus nodes (120, 125, 130) depicted in FIG. 1 may be embodied as, for example, a controller for a computer peripheral device, a controller for a computer memory device, a controller to hardware monitors and hardware sensors, and so on. Such controllers may include circuitry such as an analog-to-digital converter ('ADC'), digital-to-analog converter ('DAC'), a microcontroller, of other form of circuitry for receiving signals from and placing signals on the bus (150) to facilitate data communications between the sending bus node (115) and the receiving bus node (120, 125, 130).

The example diagram depicted in FIG. 1 includes three receiving bus nodes, including receiving bus node A (120), receiving bus node B (125), and receiving bus node C (130). Each receiving bus node is identified by a corresponding address, which identifies the receiving bus node along the bus (150). As depicted, receiving bus node A (120) is identified by address A (135), receiving bus node B (125) is identified by address B (140), and receiving bus node C (130) is identified by address C (145). The various receiving bus nodes may receive signals from the sending bus node (115) by monitoring the SDA line (110) for an address signal associated with the receiving bus node.

Data communications between the sending bus node (115) and one of the receiving bus nodes (120, 125, 130) may begin by the sending bus node (115) placing a start sequence on the bus (150). Such a start sequence can consist of the sending bus node (115) causing the signal on the SCL to be high and the sending bus node (115) also causing the signal on the SDA to transition from high to low. The sending bus node (115) may subsequently place signals on the SDA that correspond to the address of the receiving bus node (120, 125, 130) that the sending bus node (115) has targeted for data communications with the sending bus node (115). Because the bus (150) may be a multi-slave bus, such as I2C, each receiving bus node (120, 125, 130) will receive such address signals from the sending bus node (115), but only the receiving bus node (120, 125, 130) identified by such address signals will respond to the sending bus node (115). Data communications may begin if the sending bus node (115) receives an acknowledgment signal from the receiving bus node (120, 125, 130) that the sending bus node (115) has targeted for data communications.

The bus (150) depicted in FIG. 1 may be configured for address verification according to embodiments of the present invention. Verifying addresses according to embodiments of the present invention may be carried out by receiving, by the receiving bus nodes (120, 125, 130), a parity signal and an address signal from the sending bus node (115). A receiving bus node (120, 125, 130) may receive the parity signal and the address signal, for example, by listening for an address signal associated with the receiving bus node (120, 125, 130) over the SDA (110) of the bus (150). The receiving bus nodes (120, 125, 130) may monitor the SDA (110) of the bus (150) for an address signal associated with the receiving bus node (120, 125, 130) after the receiving bus nodes (120, 125, 130) have detected a start sequence as described above.

Verifying addresses in accordance with embodiments of the present invention may be further carried out by a receiving bus node (120, 125, 130) determining whether the address of the target receiving bus node (120, 125, 130) matches an address for the receiving bus node (120, 125, 130). For example, receiving bus node A (120) may listen over the bus (150) for a signal corresponding to address A (135), receiving bus node B (125) may listen over the bus (150) for a signal corresponding to address B (140), and receiving bus node C (125) may listen over the bus (150) for a signal corresponding to address C (145). Because of noise on the bus (150), however, the signal on the bus (150) may be corrupted such that the signal read by each receiving bus node (120, 125, 130) is not identical to the signal generated by the sending bus node (115).

Consider an example in which the sending bus node (115) is attempting to initiate data communications with receiving bus node A (120) by placing a signal on the bus (150) that corresponds to address A (135). Assume in such an example, however, that noise on the bus (150) interferes with the signal placed on the bus and causes each receiving bus node (120, 125, 130) to read a signal on the bus (150) that corresponds to address B (140). In such an example, receiving bus node B (125) will affirmatively determine that the address of the target receiving bus node matches its address, while receiving bus node A (120) and receiving bus node C (130) will determine that the address of the target receiving bus node does not match their respective addresses, in spite of the fact that the sending bus node (115) was attempting to initiate data communications with receiving bus node A (120).

Verifying addresses in accordance with embodiments of the present invention may be further carried out by the receiving bus node (120, 125, 130) whose address matches the address of the target receiving bus node (120, 125, 130) determining whether the parity signal associated with the address signal is an expected parity signal. A parity signal is an 'expected' parity signal if the value of the parity signal matches the value that a particular receiving bus node (120, 125, 130) expects to receive when being targeted for data communications by the sending bus node (115). In contrast, a parity signal is an 'unexpected' parity signal if the value of the parity signal does not match the value that a particular receiving bus node (120, 125, 130) expects to receive when being targeted for data communications by the sending bus node (115).

In the example depicted in FIG. 1, the value of the expected parity signal may be determined by applying a hash function or other predetermined formula to the address associated with each receiving bus node (120, 125, 130). For example, each receiving bus node (120, 125, 130) that is identified by an address that is odd in value may expect a parity signal with value of binary '1' to accompany the address signal when the sending bus node (115) is attempting to initiate data communications with such a receiving bus node (120, 125, 130). Likewise, each receiving bus node (120, 125, 130) that is identified by an address that is even in value may expect a parity signal with value of binary '0' to accompany the address signal when the sending bus node (115) is attempting to initiate data communications with such a receiving bus node (120, 125, 130). Determining whether the parity signal is an expected parity signal may therefore by carried out, for example, by the receiving bus node (120, 125, 130) whose address matches the address of the target receiving bus node (120, 125, 130) comparing the received parity signal to the expected value generated when applying the hash function, algorithm, or other predetermined formula to the address of the receiving bus node (120, 125, 130) that is performing the calculation.

Consider the example described above in which the sending bus node (115) is attempting to initiate data communications with receiving bus node A (120), but due to noise, reflection, or some other form of signal distortion, each receiving bus node (120, 125, 130) reads a signal on the bus (150) that corresponds to address B (140).

Further assume that address B (140) is an odd value, such that the expected parity signal when receiving bus node B (125) is being addressed is a signal corresponding to a binary value of 1. Also assume that address A (135) is an even value, such that the expected parity signal when receiving bus node A (120) is being addressed is a signal corresponding to a binary value of 0. In such an example, because the sending bus node (115) is attempting to initiate data communications with receiving bus node A (120), the sending bus node (115) will send a parity signal corresponding to a binary 0 with the address signal. Receiving bus node B (125)

will subsequently compare the parity signal with its expected value and determine that the parity signal associated with the address signal is not an expected parity signal.

Verifying addresses in accordance with embodiments of the present invention may be further carried out by, responsive to determining that the parity signal is not the expected parity signal, the receiving bus node (120) whose address matches the address of the target receiving bus node (120, 125, 130) suppressing an acknowledgment of receipt of the address signal. An acknowledgment of receipt of the address signal may be sent by the receiving bus node (120) whose address matches the address of the target receiving bus node (120, 125, 130), as an indication that the receiving bus node (120) whose address matches the address of the target receiving bus node (120, 125, 130) is ready for data communications with the sending bus node (115) that generated the address signal.

In the case where a particular receiving bus node (120, 125, 130) recognizes the address signal as corresponding to its address and the parity signal is expected, the receiving bus node (120, 125, 130) will send an acknowledgment of receipt of the address signal to sending bus node (115). In the case where a particular receiving bus node (120, 125, 130) recognizes the address signal as corresponding to its address but the parity signal is unexpected, however, the receiving bus node (120, 125, 130) will not send an acknowledgment signal back to sending bus node (115). Furthermore, none of the other receiving bus nodes (120, 125, 130) will send an acknowledgement as the address signal does not match their associated addresses, such that no receiving bus node (120, 125, 130) will send an acknowledgment of receipt of the address signal when the parity signal is unexpected. As such, the sending bus node (115) may respond to the lack of an acknowledgment signal by resending the address signal and parity signal over the bus (150). Readers will therefore appreciate that when the address signal is interfered with by noise, signal reflection, or the like, no receiving bus node (120, 125, 130) will send an acknowledgment of receipt of the address signal, thereby causing the sending bus node (115) to resend the address signal and parity signal that had been corrupted during a previous transmission.

Continuing with the example described above in which the sending bus node (115) is attempting to initiate data communications with receiving bus node A (120), but due to noise, reflection, or some other form of signal distortion, each receiving bus node (120, 125, 130) reads a signal on the bus (150) that corresponds to address B (140), no receiving bus node (120, 125, 130) will send an acknowledgment of receipt of the address signal, and the sending bus node (115) will resend the address signal and parity signal that had been corrupted. Receiving bus node A (120) and receiving bus node C (130) will not send an acknowledgment of receipt because they did not receive an address signal that matched their respective addresses, and receiving bus node C (125) will not send an acknowledgment of receipt because although the received address signal matched its address, the parity signal was unexpected.

Figure 2:
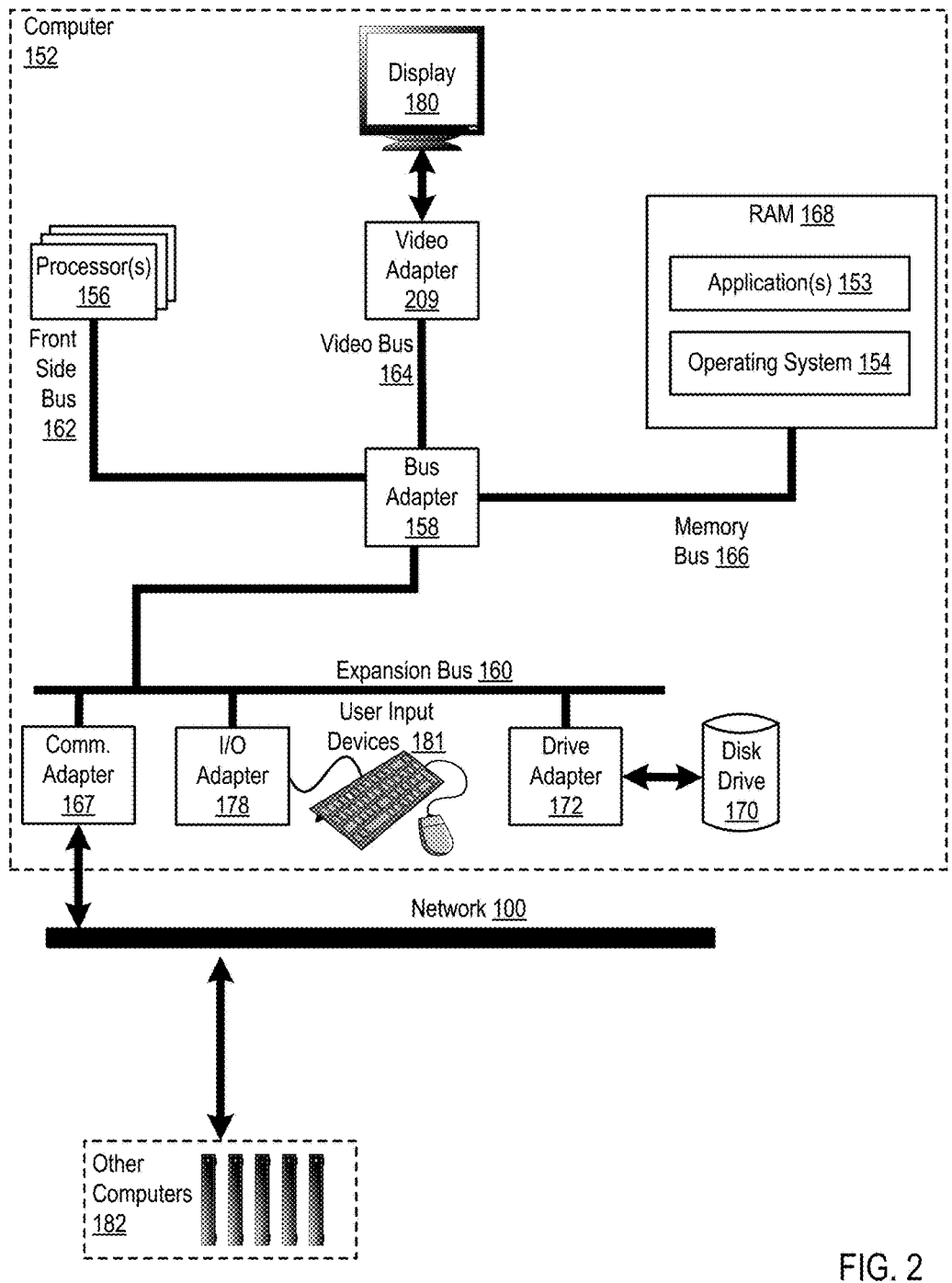
FIG. 2 sets forth a block diagram of automated computing machinery useful in address verification on a bus according to embodiments of the present invention.

Address verification on a bus connecting a plurality of receiving bus nodes and one or more sending bus nodes in accordance with the present invention is generally implemented with computers, that is, with automated computing machinery. FIG. 2 sets forth a block diagram of automated computing machinery comprising an example computer (152) useful in address verification on a bus according to embodiments of the present invention. The computer (152) of FIG. 2 includes at least one computer processor (156) or 'CPU' as well as random access memory (168) ('RAM') which is connected through a high speed memory bus (166) and bus adapter (158) to processor (156) and to other components of the computer (152).

Stored in RAM (168) is an operating system (154) and one or more applications (153). The operating system (154) is useful in executing various user-level applications (153). Operating systems according to embodiments of the present invention include UNIX™, Linux™, Microsoft XP™, AIX™, IBM's i5/OS™, and others as will occur to those of skill in the art. The operating system (154) and applications (153) in the example of FIG. 2 are shown in RAM (168), but many components of such software typically are stored in non-volatile memory also, such as, for example, on a disk drive (170).

The computer (152) of FIG. 2 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers for address verification on a bus according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 2 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 2 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The example computer (152) of FIG. 2 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for address verification on a bus according to embodiments of the present invention include modems for wired dial-up communications, Ethernet (IEEE 802.3) adapters for wired data communications network communications, and 802.11 adapters for wireless data communications network communications.

The busses (160, 162, 166) depicted in FIG. 2 may be configured for address verification according to embodiments of the present invention. In addition, the computer (152) of FIG. 2 may include additional busses that are not illustrated in FIG. 2 which may be configured for address verification according to embodiments of the present invention.

Figure 3:
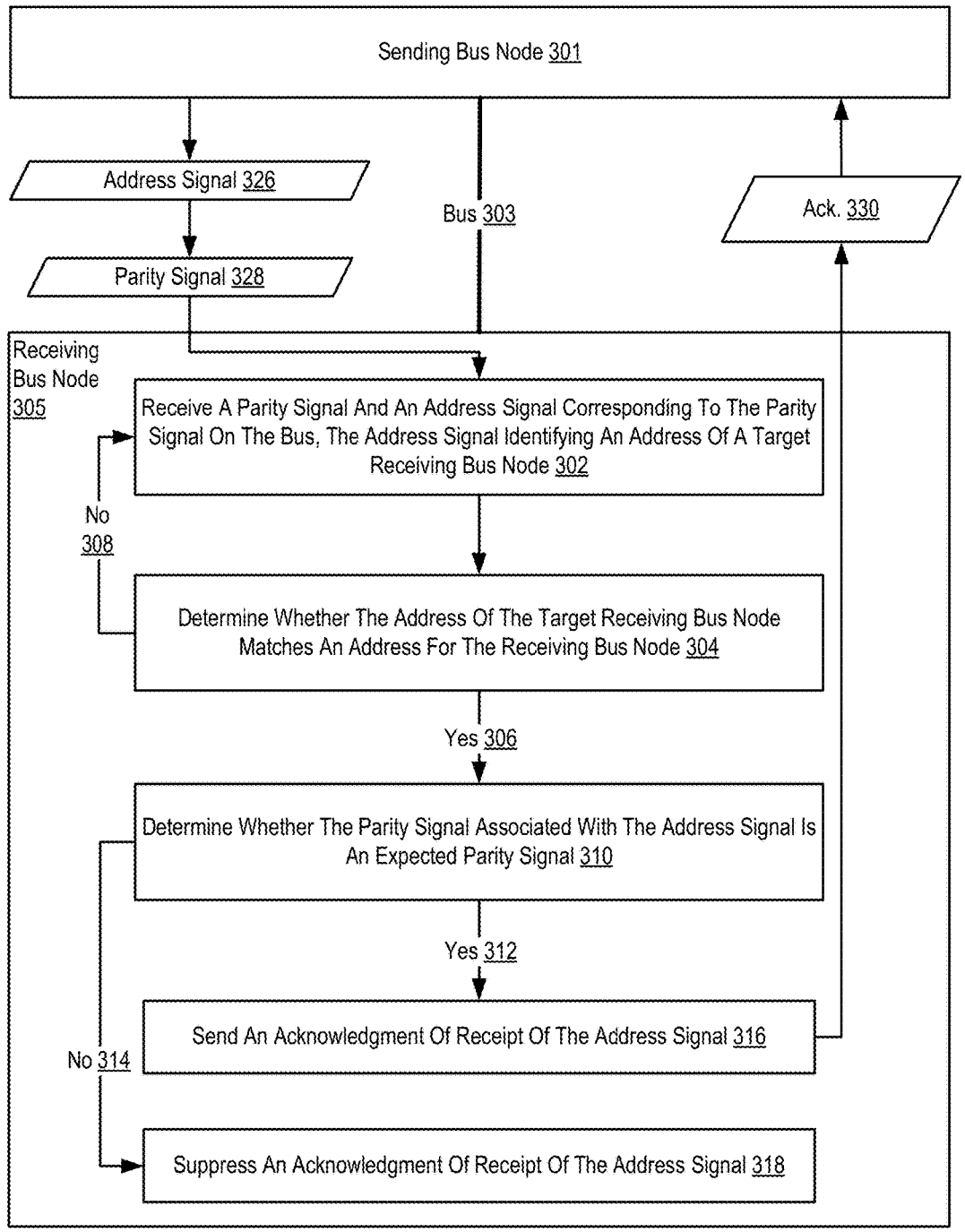
FIG. 3 sets forth a flow chart illustrating an example method for address verification on a bus according to embodiments of the present invention.

For further explanation, FIG. 3 sets forth a flow chart illustrating an example method for address verification on a bus (303) according to embodiments of the present invention. The bus (303) depicted in FIG. 3 is a communication system that allows for computer signals to be transferred among components in a computer system. As an example, one type of bus is an I2C bus that includes two bidirectional open-drain lines to various sending bus nodes, also known as master nodes, and receiving bus nodes, also known as slave nodes. The two bidirectional open-drain lines include the SDA and the SCL. Readers will appreciate that the bus (303) depicted in FIG. 3 may alternatively be embodied as any form of computer bus in which one or more sending bus nodes communicate with a plurality of receiving bus nodes over the bus (303).

The bus (303) of FIG. 3 connects a plurality of receiving bus nodes (305) and one or more sending bus nodes (301), although only one of the receiving bus nodes (305) and a single sending bus node (301) are illustrated in FIG. 3. The receiving bus node (305) may include circuitry such as an ADC, a DAC, a microcontroller, or other form of circuitry for receiving signals from and placing signals on the bus (303) to facilitate data communications between the sending bus node (301) and the receiving bus node (305). The sending bus node (301) of FIG. 3 may be embodied as computer hardware, such as a special purpose microcontroller, that generates a clock signal that is transmitted over the SCL and also initiates communication with receiving bus nodes (305). Readers of skill in the art will appreciate that although the terms 'sending' and 'receiving' are generally applied to a master device and a slave device respectively, both the sending bus node (301) and the receiving bus node (305) may send and receive data over the bus during a data communications session. A data communications session between a particular sending bus node (301) and a receiving bus node (305), however, may only be initiated by the sending bus node (301) initiating a data communications session by placing an address signal (326) identifying a targeted receiving bus node (305) on the bus (303).

The example method depicted in FIG. 3 includes receiving (302), by the receiving bus node (305), a parity signal (328) and an address signal (326). The address signal (326) of FIG. 3 identifies an address of a target receiving bus node. Referring back to FIG. 1 as an example, the address signal (326) could correspond to address A (135), address B (140), and address C (145) that identifies one of receiving bus node A (120), receiving bus node B (125), and receiving bus node C (130), respectively. The address signal (326) may be received (302) by the receiving bus node (305), for example, by the receiving bus node (305) monitoring the SDA in an embodiments in which the bus (303) is an I2C bus.

The parity signal (328) of FIG. 3 may be embodied, for example, as a signal or sequence of signals with a voltage level corresponding to a particular binary value, or as some other representation of a binary value. The value of the parity signal (328) may be calculated, according to some predetermined function, as an even binary value or as an odd binary value based on the address signal (326). For example, an address signal (326) that corresponds to a binary address that is odd in value may be accompanied by a parity signal (328) with an odd value, while an address signal (326) that corresponds to a binary address that is even in value may be accompanied by a parity signal (328) with an even value. The parity signal (328) of FIG. 3 may be transmitted by the sending bus node (301), for example, as a leading signal prior to the sending bus node (301) transmitting an address signal (326) when the sending bus node (301) is attempting initiate a data communications session with one of the receiving bus nodes (305). In the example method depicted in FIG. 3, the sending bus node (301) may send the parity signal (328) prior to sending the address signal (326) and subsequent to initiating a start sequence notifying the receiving bus node (305) that the sending bus node (301) is attempting to initiate a data communications session with one of the receiving bus nodes (305).

In an example in which the bus (303) is embodied as an I2C bus, the receiving bus node (305) of FIG. 3 can receive (302) the parity signal (324) and the address signal (326) by monitoring the SDA for signals generated by the sending bus node (301). Such signals may be characterized by predetermined voltage levels that represent binary values, and such signals may be sampled from the SDA at predetermined intervals of time, such as when a signal on the SCL is driven high by the sending bus node (301) after the sending bus node (301) has initiated a start sequence. In such a way, the receiving bus node (305) can receive (302) signals (324, 326) generated by the sending bus node (301) and the receiving bus node (305 may extrapolate an address from the address signal (326) and may extrapolate a parity bit from the parity signal (324).

The example method depicted in FIG. 3 also includes determining (304), by the receiving bus node (305), whether the address of the target receiving bus node matches an address for the receiving bus node (305). The receiving bus node (305) of FIG. 3 may determine (304) whether the address of the target receiving bus node, as identified in the address signal (326), matches the address for the receiving bus node (305) by comparing the address identified in the address signal (326) with the address for the receiving bus node (305) which may be stored in memory contained in or otherwise accessible to the receiving bus node (305). If the address of the target receiving bus node does (306) match the address for the receiving bus node (305), the receiving bus node (305) will subsequently inspect the parity signal (328) as described in more detail below. If the address of the target receiving bus node does not (308) match the address for the receiving bus node (305), however, the receiving bus node (305) will determine that it is not being targeted for data communications and will resume listening to the bus (303).

The example method depicted in FIG. 3 also includes determining (310), by the receiving bus node (305), whether the parity signal (328) associated with the address signal (326) is an expected parity signal. A parity signal (328) is an 'expected' parity signal if the value of the parity signal (328) matches the value that the receiving bus node (305) expects to receive when being targeted for data communications by the sending bus node (301). In contrast, a parity signal (328) is an 'unexpected' parity signal if the value of the parity signal (328) does not match the value that the receiving bus node (305) expects to receive when being targeted for data communications by the sending bus node (301).

In the example depicted in FIG. 3, the value of the expected parity signal may be determined by applying a hash function or other predetermined formula to the address associated with the receiving bus node (305). For example, if the receiving bus node (305) is identified by an address ending in an odd value, the receiving bus node (305) may expect a parity signal (328) with value of binary '1' to accompany the address signal when the sending bus node (301) is attempting to initiate data communications with such the receiving bus node (305). Likewise, if the receiving bus node (305) is identified by an address ending in an even value, the receiving bus node (305) may expect a parity signal (328) with value of binary '0' to accompany the address signal when the sending bus node (301) is attempting to initiate data communications with the receiving bus node (305).

Determining (310) whether the parity signal (328) associated with the address signal (326) is an expected parity signal may therefore by carried out by the receiving bus node (305) whose address matches the address of the target receiving bus node determining whether the parity signal (328) is expected or unexpected by comparing the received parity signal (328) to the expected value generated when applying the hash function or other predetermined formula to the address of the receiving bus node (305) that is performing the calculation. In the example method depicted in FIG. 3, determining (310) whether the parity signal (328) associated with the address signal (326) is an expected parity signal may be carried out in response to affirmatively (306) determining, by the receiving bus node (305), that the address of the target receiving bus node matches the address for the receiving bus node (305).

The example method depicted in FIG. 3 also includes, responsive to determining that the parity signal (328) is not (314) the expected parity signal, suppressing (318) an acknowledgment (330) of receipt of the address signal (326). An acknowledgment (330) of receipt of the address signal (326) may be sent by the receiving bus node (305) whose address matches the address of the target receiving bus node (305), as an indication that the receiving bus node (305) whose address matches the address of the target receiving bus node (305) is ready for data communications with the sending bus node (301) that generated the address signal (326). In the case where the receiving bus node (305) recognizes the address signal (326) as corresponding to its address but the parity signal (328) is unexpected, however, the receiving bus node (305) will suppress (318) the acknowledgment (330) signal and therefore will not send an acknowledgment (330) signal back to sending bus node (301). Readers will appreciate that when the address signal (326) is interfered with by noise, signal reflection, or the like, no receiving bus node (305) will send an acknowledgment (330) of receipt of the address signal (326), thereby causing the sending bus node (301) to resend the address signal (326) and parity signal (328) that had been corrupted during a previous transmission.

The example method depicted in FIG. 3 also includes, responsive to determining in the affirmative (312) that the parity signal is the expected parity signal, sending (316), by the receiving bus node (305), an acknowledgment (330) of receipt of the address signal. That is, in the case where the receiving bus node (305) recognizes the address signal (326) as corresponding to its address and the parity signal (328) is expected, the receiving bus node (305) will send an acknowledgment of receipt of the address signal (326) to sending bus node (301).

Figure 4:
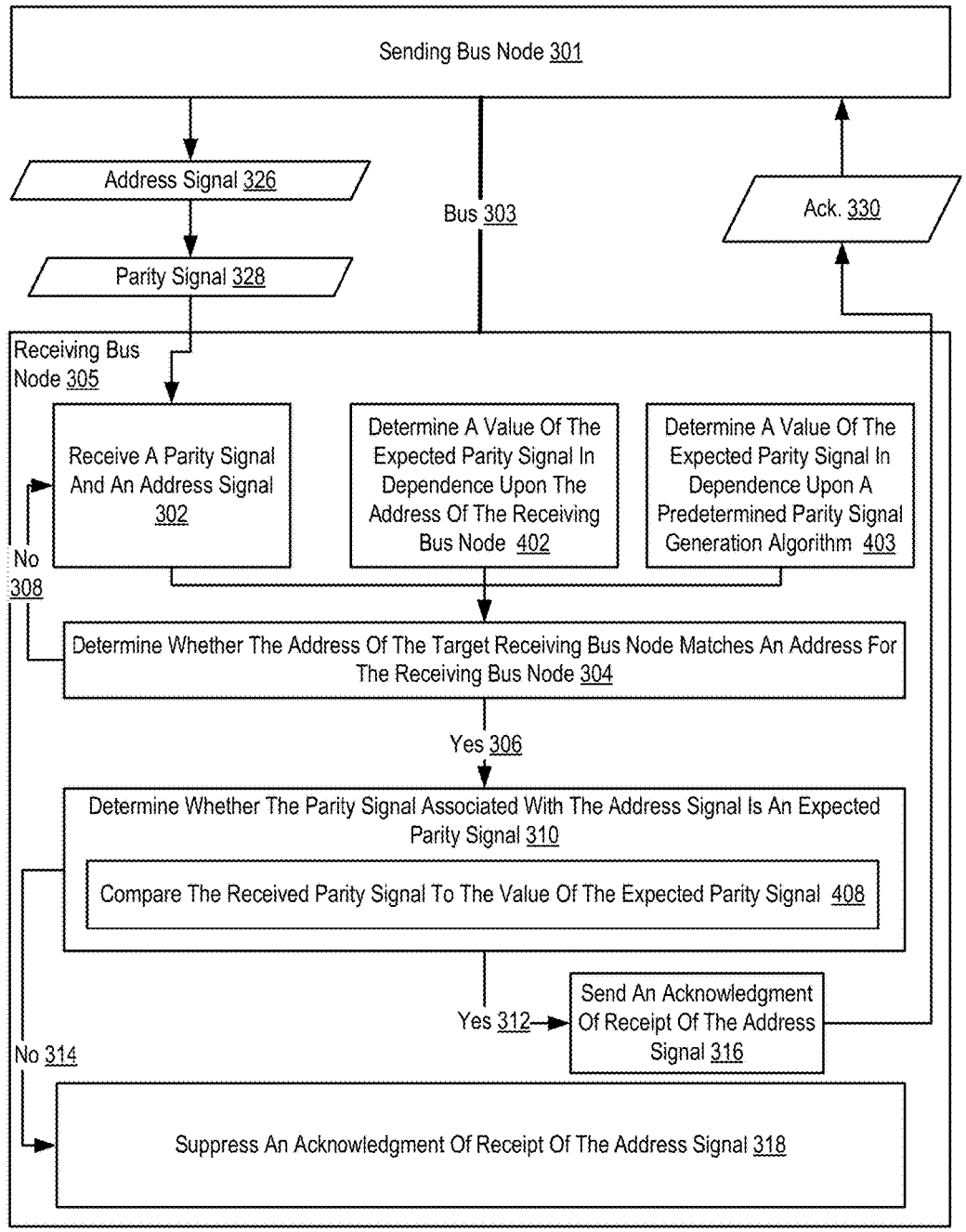
FIG. 4 sets forth a flow chart illustrating an additional example method for address verification on a bus according to embodiments of the present invention.

For further explanation, FIG. 4 sets forth a flow chart illustrating an additional example method for address verification on a bus (303) according to embodiments of the present invention. The example method depicted in FIG. 4 is similar to the example method depicted in FIG. 3, as it also includes receiving (302) a parity signal (328) and an address signal (326), determining (304) whether the address of the target receiving bus node matches an address for the receiving bus node (305), determining (310) whether the parity signal (328) is an expected parity signal, and suppressing (318) an acknowledgment (330) of receipt of the address signal (326).

The example method depicted in FIG. 4 also includes determining (402), by the receiving bus node (305), a value of the expected parity signal in dependence upon the address of the receiving bus node (305). Determining (402) a value of the expected parity signal in dependence upon the address of the receiving bus node (305) may be carried out, for example, by applying a hash function or other predetermined formula using the address of the receiving bus node (305) as an input to the hash function or other predetermined formula. In such a way, a particular receiving bus node (305) will always expect a particular parity signal to be received when the receiving bus node (305) is addressed by the sending bus node (301), so long as the address of the receiving bus node (305) and the hash function or other predetermined formula do not change. In the example method depicted in FIG. 4, determining (310) whether the parity signal (328) associated with the address signal (326) is an expected parity signal can therefore include comparing (408) the received parity signal to the calculated value of the expected parity signal.

The example method depicted in FIG. 4 also includes determining (403), by the receiving bus node (305), a value of the expected parity signal in dependence upon a predetermined parity signal generation algorithm. Determining (403) a value of the expected parity signal in dependence upon the predetermined parity signal generation algorithm may be carried out, for example, by applying predetermined parity signal generation algorithm that utilizes the address of the receiving bus node (305) as an input, that utilizes another identifier of the receiving bus node (305) as an input, and so on. In such a way, a particular receiving bus node (305) will always expect a particular parity signal to be received when the receiving bus node (305) is addressed by the sending bus node (301), so long as the identifier of the receiving bus node (305) and the predetermined parity signal generation algorithm do not change. In the example method depicted in FIG. 4, determining (310) whether the parity signal (328) associated with the address signal (326) is an expected parity signal can therefore include comparing (408) the received parity signal to the calculated value of the expected parity signal.

Figure 5:
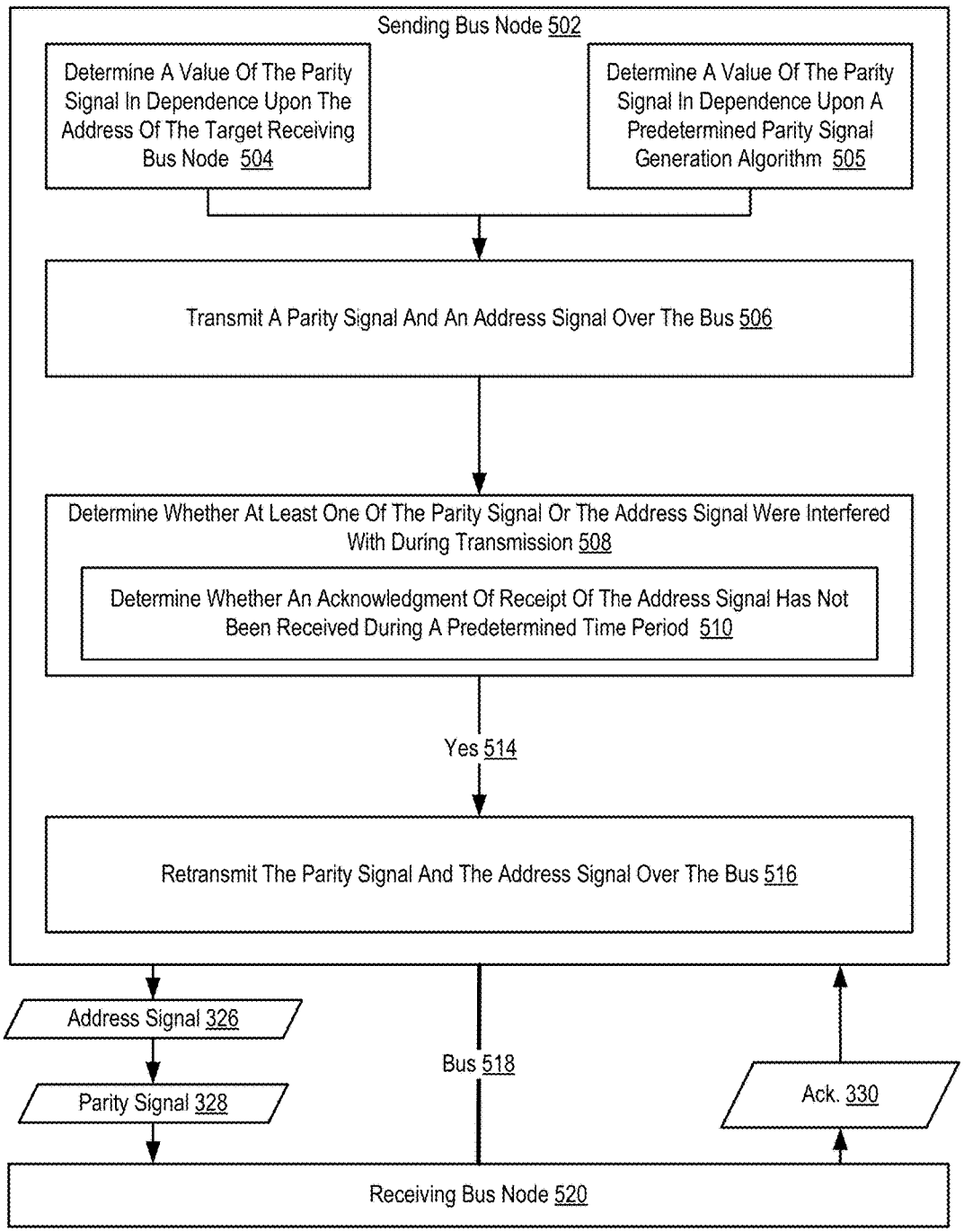
FIG. 5 sets forth a flow chart illustrating an additional example method for address verification on a bus according to embodiments of the present invention.

For further explanation, FIG. 5 sets forth a flow chart illustrating an additional example method for address verification on a bus (518) according to embodiments of the present invention. The bus (518) depicted in FIG. 5 is a communication system that allows for computer signals to be transferred among components in a computer system. As an example, one type of bus is an I2C bus that includes two bidirectional open-drain lines to various sending bus nodes, also known as master nodes, and receiving bus nodes, also known as slave nodes. The two bidirectional open-drain lines include the SDA and the SCL. Readers will appreciate that the bus (518) depicted in FIG. 5 may alternatively be embodied as any form of computer bus in which one or more sending bus nodes communicate with a plurality of receiving bus nodes over the bus (518).

The bus (518) of FIG. 5 connects a plurality of receiving bus nodes (520) and one or more sending bus nodes (502), although only one of the receiving bus nodes (520) and a single sending bus node (502) are illustrated in FIG. 5. The receiving bus node (520) may include circuitry such as an ADC, a DAC, a microcontroller, or other form of circuitry for receiving signals from and placing signals on the bus (518) to facilitate data communications between the sending bus node (502) and the receiving bus node (520). The sending bus node (502) of FIG. 5 may be embodied as computer hardware, such as a special purpose microcontroller, that generates a clock signal that is transmitted over the SCL and also initiates communication with receiving bus nodes (520). Readers of skill in the art will appreciate that although the terms 'sending' and 'receiving' are generally applied to a master device and a slave device respectively, both the sending bus node (502) and the receiving bus node (520) may send and receive data over the bus during a data communications session. A data communications session between a particular sending bus node (502) and a receiving bus node (520), however, may only be initiated by the sending bus node (502) initiating a data communications session by placing an address signal (326) identifying a targeted receiving bus node (520) on the bus (518).

The example method depicted in FIG. 5 includes determining (504), by the sending bus node (502), a value of a parity signal (328) in dependence upon the address of a target receiving bus node. The sending bus node (502) may determine (504) a value of a parity signal (328), for example, by applying a hash function or some other formula using the address of the target receiving bus node as an input. For example, an address of the target receiving bus node that is odd in value may be accompanied by a parity signal with an odd value, while an address of the target receiving bus node that is even in value may be accompanied by a parity signal with an even value.

The example method depicted in FIG. 5 includes determining (505), by the sending bus node (502), a value of a parity signal (328) in dependence upon a predetermined parity signal generation algorithm. The sending bus node (502) may determine (505) a value of a parity signal (328), for example, by applying the predetermined parity signal generation algorithm using the address of the target receiving bus node as an input, using another identifier of the target receiving bus node as an input, and so on. For example, the predetermined parity signal generation algorithm may be structured such that an address of the target receiving bus node that is odd in value may be accompanied by a parity signal with an odd value, while an address of the target receiving bus node that is even in value may be accompanied by a parity signal with an even value.

The example method depicted in FIG. 5 also includes transmitting (506), by the sending bus node (502), a parity signal (328) and an address signal (326) corresponding to the parity signal over the bus (518). The address signal (326) depicted in FIG. 5 can identify the address of the target receiving bus node. The sending bus node (502) can transmit (506) the parity signal (328) and the address signal (326), for example, as signals that are sent over the SDA line of an I2C bus after the sending bus node (502) has initiated a start sequence. In such an example, each receiving bus node (520) may sample the signals on the SDA line at predetermined intervals of time that are controlled by a clock signal that the sending bus node (502) places on the SCL line.

In the example method depicted in FIG. 5, the parity signal (328) may be transmitted after a communications start sequence and prior to transmitting the address signal (326). The communications start sequence may be embodied as a sequence of signals placed on a predetermined set of transmission lines. Such a communications start sequence may be initiated by a master node on a bus and received by all slave nodes on the bus to alert the slave nodes that the master node is initiating data communications with at least one of the slave nodes. For example, when the bus (518) is embodied as an I2C bus, the communications start sequence can consist of the sending bus node (502) causing the signal on the SCL to be high and the sending bus node (502) also causing the signal on the SDA to transition from high to low. In such an example, the sending bus node (502) may subsequently place signals on the SDA that correspond to the parity signal prior to the SCL going low and the SCL operating as a clock signal for reading signals on the SDA. After transmitting the parity signal, the sending bus node (502) may subsequently place signals on the SDA that correspond to the address of the receiving bus node (520) that the sending bus node (502) has targeted for data communications. Data communications may begin if the sending bus node (502) receives an acknowledgment signal from the receiving bus node (520) that the sending bus node (502) has targeted for data communications.

The example method depicted in FIG. 5 also includes determining (508), by the sending bus node (502), whether at least one of the parity signal (328) or the address signal (326) were interfered with during transmission. The sending bus node (502) may determine (508) whether at least one of the parity signal (328) or the address signal (326) were interfered with during transmission, for example, by determining (510) whether an acknowledgment of receipt of the address signal has not been received during a predetermined time period. In such a way, the sending bus node (502) may determine that the attempt to initiate data communications with a particular receiving bus node has timed out.

The example method depicted in FIG. 5 also includes, responsive to affirmatively (514) determining that at least one of the parity signal (328) or the address signal (326) were interfered with during transmission, retransmitting (516) the parity signal (328) and the address signal (328) over the bus (518). The sending bus node (502) may retransmit (516) the parity signal (328) and the address signal (326) over the bus (518) by resending each signal, by resending each signal after initiating a start sequence, by resending each signal after initiating a stop sequence and a start sequence, and so on as is required by the protocol that controls the operation of the bus (518).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the various flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the various flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that two or more blocks depicted in different flowcharts may occur a single embodiment. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of address verification on a bus, the bus connecting a plurality of receiving bus nodes and one or more sending bus nodes, the bus providing communication among the bus nodes, the method comprising:
   receiving, by a receiving bus node over the bus, a parity signal and an address signal, the address signal identifying an address of a target receiving bus node, wherein the receiving bus node first receives the address signal as a plurality of bits on a signal line of the bus and, immediately following the address signal, receives the parity signal as at least one bit on the same signal line;
   determining, by the receiving bus node, whether the address of the target receiving bus node matches an address of the receiving bus node;
   responsive to determining that the address of the target receiving bus node matches the address of the receiving bus node, determining, by the receiving bus node, whether the parity signal is an expected parity signal, wherein values of the parity signal and the expected parity signal are determined based on an address of a corresponding receiving bus node;
   responsive to determining that the address of the target receiving bus node does not match an address of the receiving bus node, suppressing, by the receiving bus node, an acknowledgment of receipt of the address signal; and responsive to determining that both the address of the target receiving bus node matches an address of the receiving bus node and the parity signal is not the expected parity signal, suppressing, by the receiving bus node, the acknowledgment of receipt of the address signal.

2. The method of claim 1 further comprising responsive to determining that the parity signal is the expected parity signal, sending, by the receiving bus node to the sending bus node over the bus, an acknowledgment of receipt of the address signal.

3. The method of claim 1 further comprising determining, by the receiving bus node, a value of the expected parity signal in dependence upon the address of the receiving bus node.

4. The method of claim 1 further comprising determining, by the receiving bus node, a value of the expected parity signal in dependence upon a predetermined parity signal generation algorithm.

5. The method of claim 4 wherein determining whether the parity signal associated with the address signal is an expected parity signal further comprises comparing the received parity signal to the value of the expected parity signal.

6. The method of claim 1 wherein the bus is an I2C bus.

7. The method of claim 1, wherein the address signal and the parity signal following the address signal is received on a serial data line of an I2C bus.

8. An apparatus for address verification on a bus, the bus connecting a plurality of receiving bus nodes and one or more sending bus nodes, the bus providing communication among the bus nodes, the apparatus comprising a receiving bus node configured to perform the steps of:

receiving, by a receiving bus node over the bus, a parity signal and an address signal, the address signal identifying an address of a target receiving bus node, wherein the receiving bus node first receives the address signal as a plurality of bits on a signal line of the bus and, immediately following the address signal, receives the parity signal as at least one bit on the same signal line;

determining, by the receiving bus node, whether the address of the target receiving bus node matches an address of the receiving bus node;

responsive to determining that the address of the target receiving bus node matches the address of the receiving bus node, determining, by the receiving bus node, whether the parity signal is an expected parity signal, wherein values of the parity signal and the expected parity signal are determined based on an address of a corresponding receiving bus node;

responsive to determining that the address of the target receiving bus node does not match an address of the receiving bus node, suppressing, by the receiving bus node, an acknowledgment of receipt of the address signal; and responsive to determining that both the address of the target receiving bus node matches an address of the receiving bus node and the parity signal is not the expected parity signal, suppressing, by the receiving bus node, the acknowledgment of receipt of the address signal.

9. The apparatus of claim 8 wherein the receiving bus node is further configured to perform the step of, responsive to determining that the parity signal is the expected parity signal, sending, by the receiving bus node to the sending bus node over the bus, an acknowledgment of receipt of the address signal.

10. The apparatus of claim 8 wherein the receiving bus node is further configured to perform the step of determining a value of the expected parity signal in dependence upon the address of the receiving bus node.

11. The apparatus of claim 8 wherein the receiving bus node is further configured to perform the step of determining a value of the expected parity signal in dependence upon a predetermined parity signal generation algorithm.

12. The apparatus of claim 8 wherein determining whether the parity signal associated with the address signal is an expected parity signal further comprises comparing the received parity signal to the value of the expected parity signal.

13. The apparatus of claim 8 wherein the bus is an I2C bus.

14. The apparatus of claim 8, wherein the address signal and the parity signal following the address signal is received on a serial data line of an I2C bus.

15. A method of address verification on a bus, the bus connecting a plurality of receiving bus nodes and one or more sending bus nodes, the bus providing communication among the bus nodes, the method comprising:

transmitting, by a sending bus node over the bus, a parity signal and an address signal, the address signal identifying an address of a target receiving bus node, wherein the sending bus node first transmits the address signal as a plurality of bits on a signal line of the bus and, immediately following the address signal, transmits the parity signal as at least one bit on the same signal line;

determining, by a receiving bus node, whether the address of the target receiving bus node matches an address of the receiving bus node;

responsive to determining that the address of the target receiving bus node matches the address of the receiving bus node, determining, by the receiving bus node, whether the parity signal is an expected parity signal, wherein values of the parity signal and the expected parity signal are determined based on an address of a corresponding receiving bus node;

responsive to determining that the address of the target receiving bus node does not match an address of the receiving bus node, suppressing, by the receiving bus node, an acknowledgment of receipt of the address signal;

responsive to determining that both the address of the target receiving bus node matches an address of the receiving bus node and the parity signal is not the expected parity signal, suppressing, by the receiving bus node, the acknowledgment of receipt of the address signal;

determining, by the sending bus node, whether at least one of the parity signal or the address signal were interfered with during transmission; and responsive to determining that at least one of the parity signal and the address signal were interfered with during transmission, retransmitting, by the sending bus node over the bus, the parity signal and the address signal.

16. The method of claim 15 wherein determining whether at least one of the parity signal or the address signal were interfered with during transmission further comprises determining whether an acknowledgment of receipt of the address signal has not been received during a predetermined time period.

17. The method of claim 15 wherein the parity signal is transmitted after a communications start sequence and prior to transmitting the address signal.

18. The method of claim 15 further comprising determining a value of the parity signal in dependence upon the address of the target receiving bus node.

19. The method of claim 15 further comprising determining a value of the parity signal in dependence upon a predetermined parity signal generation algorithm.

20. The method of claim 15 wherein the bus is an I2C bus, and wherein the address signal and the parity signal following the address signal is received on a serial data line of the I2C bus.

* * * * *